3,337,642
PROCESS FOR THE PURIFICATION OF 2,6-DIMETHYLPHENOL

Cornelis A. M. Hoefs, Elst, and Otto E. van Lohuizen, Arnhem, Netherlands, assignors to N. V. Onderzoekingsinstituut Research, Arnhem, Netherlands, a corporation of the Netherlands
No Drawing. Filed May 21, 1964, Ser. No. 369,292
Claims priority, application Netherlands, June 4, 1963, 293,612
2 Claims. (Cl. 260—621)

This invention relates to a process for the purification of 2,6-dimethylphenol.

Such processes are broadly known. The previously known processes, however, show great disadvantages. The impurities associated with the 2,6-dimethylphenol consist to a great extent of cresols which are very difficult to separate from the 2,6-dimethylphenol. For instance, only a small fraction of the ortho-cresol can be separated by distillation and the meta- and para-cresol are hardly removed at all. No improvement of the purity is obtained by employing sublimation. Purification by subjecting the 2,6-dimethylphenol in an aqueous alkaline solution to steam distillation is very cumbersome, and in the alkaline medium oxidation of the compound to be purified readily occurs, as a result of which in most cases a highly colored product is obtained. Moreover, the product obtained by these methods is not sufficiently pure to be used as a starting material for polymerization reactions.

2,6-dimethylphenol being the starting material for the preparation of aromatic polyethers which have some particularly favorable properties, there is a substantial need for a simple process by which this compound can be purified to such an extent that it is suitable for use as a starting material for polymerization reactions.

It is the object of the present invention to provide such a process.

According to the present invention, a solution is prepared of the 2,6-dimethylphenol to be purified in a mixture of water and a diol having not more than 5 carbon atoms, which solution is cooled down so that the 2,6-dimethylphenol therein is caused to crystallize, after which the crystals formed are separated from the liquid.

Diols that are suitable for use in the process according to the present invention are ethylene glycol; 1,2-propanediol; 1,3-propanediol; 1,3-butanediol; 1,4-butanediol; 2,3-butanediol; and the methyl-substituted derivatives thereof, and, moreover, the various pentanediols.

For industrial use it is preferred to employ ethylene glycol, because this is a readily obtainable compound with which excellent results are obtained.

The solution of the 2,6-dimethylphenol in the water-glycol mixture is preferably prepared below 30° C., because the use of higher temperatures may give rise during cooling to a condition wherein the product to be purified becomes separated from the solution while it is still in the liquid state. While the liquid thus separated may still be caused to crystallize, for instance by means of seed crystals, in that case a product is obtained the purity of which is not so high as when the solution is prepared at a temperature below 30° C.

For carrying out the process according to the present invention, a method which gives particularly favorable results and is therefore preferred comprises dissolving the 2,6-dimethylphenol to be purified at a temperature of about 26° C. in ethylene glycol to which, with stirring, so much water is added to the solution that it shows a permanent turbidity whereupon the solution is cooled down to below 0° C. and the resulting crystals are then separated from the liquid.

In this way associated impurities, such as the cresols and especially o-cresol, are removed to a very great extent and the loss of the desired product is only very small.

It has been found that optimum results are obtained if the solution which is cooled down contains about 52% by weight of ethylene glycol, about 32.5% by weight of water, and about 15.5% by weight of 2,6-dimethylphenol.

By preference, the solution is cooled down to a temperature of about −20° C. In this way the highest yield is obtained. Cooling down to still lower temperatures is useless, because to do so does not further improve either the yield or the quality of the desired product.

In general, there are advantages in introducing into the solution a few small seed crystals of 2,6-dimethylphenol. By preference these small seed crystals are introduced after so much water has been added to the glycol solution that it shows a permanent turbidity.

The purity of the end-product obtained is, of course, dependent on the starting material. It has been found that by the process according to the present invention it is possible to obtain a very thorough removal of impurities which are very difficult to separate in any other way. For instance, o-cresol and 2,4-dimethylphenol can be satisfactorily removed from 2,6-dimethylphenol by the present process even if they are present in amounts of, say, up to 30%.

If a product of very high purity is desired, then the process according to the present invention is repeated one or more times.

The mother liquor obtained according to the present invention contains, in addition to the diol such as glycol, water, and the impurities, still further quantities of 2,6-dimethylphenol. After steam distillation of the mother liquor, pure diol (e.g., glycol) is left which can be used over again. The remaining 2,6-dimethylphenol is distilled over with the water and can, if desired be recovered.

The invention is further elucidated with the aid of the following examples which are given by way of illustration only and not by way of limitation.

Example I 14.9 parts by weight of crude 2,6-dimethylphenol containing 6.2% by weight of impurities are dissolved in 59.7 parts by weight of pure ethylene glycol. To the mixture are added, with stirring, 25.4 parts by weight of water, as a result of which the solution becomes turbid. Then a few small crystals of pure 2,6-dimethylphenol are added and the mixture is cooled down to −20° C., as a result of which a large amount of crystals is formed which crystals are filtered off and washed with ice water.

In this way, 12.6 parts by weight of 2,6-dimethylphenol are obtained containing 0.40% by weight of impurities.

Example II

Of the 2,6-dimethylphenol purified in the way indicated in Example I so that it still contains 0.40% by weight of impurities, 26 parts by weight are dissolved in 58.1 parts by weight of pure ethylene glycol at 26° C. The clear solution is filtered, after which 29.8 parts by weight of water of 26° C. are added with stirring. After a few seed crystals have been added, the solution is slowly cooled down to −20° C., after which the crystals formed are filtered off. After washing with ice-water and drying, 11.7 parts by weight of 2,6-dimethylphenol are obtained containing 0.03% by weight of impurities.

Example III

At 28° C., 13.0 parts by weight of 2,6-dimethylphenol containing 1.7% by weight of impurities are dissolved in 51.9 parts by weight of pure ethylene glycol. To the solution thus obtained, 35.1 parts by weight of water and thereafter a few crystals of pure 2,6-dimethylphenol are added. Then the solution is cooled down to −20° C. and the resulting crystals are filtered off. After washing with ice water and drying, 12.5 parts by weight of 2,6-dimethylphenol are obtained containing 0.05% by weight of impurities.

*Example IV*

The procedure of Example III is repeated, and this time the process is started with 13.0 parts by weight of the purified product containing 0.05% by weight of impurities obtained in Example III. This time 12.5 parts by weight of a 2,6-dimethylphenol are obtained containing 0.01% by weight of impurities.

*Example V*

The procedure of Example III is repeated, and this time the process is started with 13.0 parts by weight of the purified product containing 0.01% by weight of impurities obtained in Example IV. This time 12.5 parts by weight of 2,6-dimethylphenol are obtained in which impurities can no longer be detected by chromatographic methods sensitive to traces thereof greater than 0.002% by weight.

While specific examples of preferred methods embodying the present invention have been described above, it will be apparent that many changes and modifications may be made in the details of the methods of procedure without departing from the true spirit of the invention. It will therefore be understood that the particular methods set forth above are intended to be illustrative only, and are not intended to limit the scope of the invention which is defined by the following claims.

What is claimed is:
1. A process for the purification of 2,6-dimethylphenol containing up to 30% by weight of impurities including cresols comprising preparing a solution of the 2,6-dimethylphenol to be purified in a mixture of water and ethylene glycol at a temperature below 30° C., thereafter adding sufficient water to the solution, with stirring, so that it shows permanent turbidity, then cooling the resulting solution to a temperature below 0° C. at which 2,6-dimethylphenol crystallizes out, and separating the resulting crystals of relatively pure 2,6-dimethylphenol from the remaining liquid.

2. A process according to claim 1, wherein the solution that is subjected to cooling contains about 52% by weight of ethylene glycol, about 32.5% by weight of water, and about 15.5% by weight of 2,6-dimethylphenol.

References Cited

UNITED STATES PATENTS

| | | | |
|---|---|---|---|
| 2,370,554 | 2/1945 | Luten et al. | 260—621 |
| 2,526,807 | 10/1950 | Cislak et al. | 260—621 X |
| 2,969,401 | 1/1961 | Young et al. | |

LEON ZITVER, *Primary Examiner.*

D. M. HELFER, H. ROBERTS, *Assistant Examiners.*